United States Patent
Kozek et al.

(10) Patent No.: US 8,111,637 B2
(45) Date of Patent: Feb. 7, 2012

(54) METHOD, ARRANGEMENT AND DEVICE FOR PRECOMPENSATION OF CROSSTALK IN A DSL MIMO SYSTEM

(75) Inventors: Werner Kozek, Vienna (AT); Matthias Schnitter, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 293 days.

(21) Appl. No.: 12/513,062

(22) PCT Filed: Oct. 22, 2007

(86) PCT No.: PCT/EP2007/061298
§ 371 (c)(1),
(2), (4) Date: May 14, 2009

(87) PCT Pub. No.: WO2008/052904
PCT Pub. Date: May 8, 2008

(65) Prior Publication Data
US 2010/0046649 A1 Feb. 25, 2010

(30) Foreign Application Priority Data
Oct. 31, 2006 (DE) .......................... 10 2006 051 435

(51) Int. Cl.
*H04L 12/16* (2006.01)
*H04B 3/20* (2006.01)
(52) U.S. Cl. ........................................ 370/268; 370/286
(58) Field of Classification Search .................. None
See application file for complete search history.

(56) References Cited

U.S. PATENT DOCUMENTS

| | | | |
|---|---|---|---|
| 6,381,284 B1 * | 4/2002 | Strizhevskiy | 375/257 |
| 7,023,908 B2 | 4/2006 | Nordstrom et al. | |
| 7,567,666 B2 * | 7/2009 | Zimmerman et al. | 379/417 |
| 7,623,605 B2 * | 11/2009 | Wu et al. | 375/350 |
| 7,742,386 B2 * | 6/2010 | Jones et al. | 370/201 |
| 7,860,201 B2 * | 12/2010 | Wu et al. | 375/350 |

(Continued)

FOREIGN PATENT DOCUMENTS
EP 1109328 A1 6/2001
(Continued)

OTHER PUBLICATIONS

Ginis, et al.: "Vectored Transmission for Digital Subscriber Line Systems", XP-01143167, IEEE Journal on selected areas in communications. vol. 20, No. 5, Jun. 2002, pp. 1085-1104 mentioned in declaration Figures 8,9.

(Continued)

*Primary Examiner* — Andrew Lee
(74) *Attorney, Agent, or Firm* — Laurence A. Greenberg; Werner H. Stemer; Ralph E. Locher

(57) ABSTRACT

A method, an arrangement and a device for transmitting data via a plurality of channels. Additional data d are transmitted via at least one channel, and the transmission of the additional data d influences the transmission of the data in at least one of the further channels. The transmission of the data in the at least one of the further channels is influenced for example in such a way as to reduce interference, such as crosstalk, for instance, in the at least one of the further channels. The additional data d are advantageously transmitted during pauses in the user data transmission of the at least one channel.

13 Claims, 5 Drawing Sheets

U.S. PATENT DOCUMENTS

| | | | |
|---|---|---|---|
| 2008/0137620 A1* | 6/2008 | Wang et al. | 370/337 |
| 2008/0273638 A1* | 11/2008 | Singh et al. | 375/346 |
| 2008/0310557 A1* | 12/2008 | Gaikwad | 375/340 |
| 2010/0329386 A1* | 12/2010 | De Lind Van Wijngaarden | 375/296 |
| 2011/0044448 A1* | 2/2011 | Chen et al. | 379/406.08 |

FOREIGN PATENT DOCUMENTS

| | | |
|---|---|---|
| WO | 2004105287 A2 | 12/2004 |

OTHER PUBLICATIONS

Cendrillon, et al.: "Improved Linear Crosstalk Precompensation for DSL", IEEE International Conference on Acoustics, Speech and Signal processing, 2004, pp. IV 1053-1056.

Tauböck et al.: "Mimo Systems in the Subscriber-Line Network", 5th International OFDM Workshop 2000, Hamburg.

* cited by examiner

FIG. 8

|  | Bridge | Router |  |
|---|---|---|---|
| FCS incorrect | Reject | Reject | Destination address arbitrary |
| Type incorrect | Forward | Reject | |
| Length incorrect | Forward | Reject | |
| Frame too long | Forward | Reject | |
| Multicast address | Forward | Do not forward | |
| Slow_Protocols_ Multicast address | Do not forward if [IEEE8023], annex 43B supported | Do not forward if [IEEE8023], annex 43B supported | |
| Protocol subtype ID incorrect | Reject if [IEEE8023], annex 43B supported | Reject if [IEEE8023], annex 43B supported | |

FIG. 9

| Destination address | Source address | Length/type | MAC client data | Frame test sequence |
|---|---|---|---|---|

METHOD, ARRANGEMENT AND DEVICE FOR PRECOMPENSATION OF CROSSTALK IN A DSL MIMO SYSTEM

BACKGROUND OF THE INVENTION

Field of the Invention

The invention relates to a method, an arrangement and a device for transferring data via a plurality of channels.

In current telecommunication networks, the subscribers increasingly require higher transfer rates and hence greater available bandwidth. These higher transfer rates are necessary since individual communication networks are currently and in future will be used to provide a plurality of extremely data-intensive applications. The operators of telecommunication networks thus provide bandwidth-intensive applications such as rapid access to the Internet or else video transfers via the Internet (e.g. IPTV: "Internet Protocol Television"). At the same time, however, many users also require that the data be transferred as rapidly as possible and in real time so as to allow the use of services such as Voice over IP ("VoIP"—voice transmission using the Internet protocol) or else online games without drawbacks.

Current methods for transferring such volumes of data via the conventional telephone network are methods which operate on the basis of the xDSL method (e.g. ADSL, ADSL2, VDSL). In the majority of such, currently standardized broadband access methods, the basic concept is aimed at continuous transfer at a constant bit rate, with constant bit error probability and with a constant transmission spectrum. Although setting up a communication link, that is to say starting the DSL modem arranged at the subscriber end, for example, during what is known as the training phase involves configuration with respect to the channel properties of rate, bit error probability and latency of the link, for example, inter alia, the subsequent ongoing operation then usually involves nothing being altered with respect to the previously adjusted parameters, however.

In methods of this kind, particularly the current trend toward more and more IP-based applications with a high-level fluctuating user data rate ("bursty traffic") therefore results in a large amount of dummy data being transmitted via the link. This means that even in phases in which the user data traffic is comparatively little, the initially negotiated data rate needs to be observed. This is achieved by transferring dummy data packets, which are rejected without heed at the receiver, instead of the user data.

One problem with transfer methods such as the xDSL methods are the interfering influences which result from near end crosstalk and far end crosstalk. This crosstalk relates to the fact that adjacent connections have an interfering influence on one another on account of their physical proximity to one another. Crosstalk is generally undesirable reciprocal influencing of transfer channels in telecommunication networks or in the wiring of LANs. This is frequency-based influencing of adjacent conductor pairs that can be attributed to capacitive and inductive coupling between current-carrying lines. This problem is manifested in telephone networks in particular, since in telecommunication networks individual subscriber lines (usually pairs or wires) are frequently laid in bundles to some extent and span a large portion of the distance between the switching unit and the subscriber terminal in the same wiring loom. However, a single subscriber line can also interfere with itself: thus, the upstream channel (from the subscriber to the exchange) and the downstream channel (from the exchange to the subscriber) within a subscriber line can interfere with one another.

Near end crosstalk (NEXT), also called transverse attenuation, is a measure of the suppression of the crosstalk between two adjacent pairs of wires at the end or start of a cable. Near end crosstalk indicates the degree to which the signal on one pair of wires is induced in the other pair of wires. Near end crosstalk is relatively length-independent but highly frequency-dependent. NEXT values can be influenced by design measures, such as different lays or additional shielding of the pairs of wires.

Far end crosstalk, on the other hand, relates to the end of the line, that is to say the end of the transmission link. The signal injected into a line is reduced by the cable damping at the end of the line. The crosstalk from this signal onto another line is referred to as far end crosstalk (FEXT).

BRIEF SUMMARY OF THE INVENTION

The object of the invention is to reduce interference on lines within a communication system.

This object is achieved on the basis of the claimed method and by an arrangement and a device according to the claims.

The method according to the invention involves data being transferred via a plurality of channels. The fundamental aspect of the method according to the invention is that at least one channel is used to transfer additional data and the transfer of the additional data influences the transfer of the data in at least one of the further channels in a specific manner. The method is therefore able to influence the data transfer on a transfer channel from the outside.

Advantageously, the transfer of the data in the at least one of the further channels is influenced such that interference in the at least one of the further channels is reduced. This development allows interference as may arise in a communication system as a result of crosstalk, for example, to be reduced.

In another advantageous development of the method according to the invention, the additional data are transferred instead of dummy data. In this context, dummy data means "no user data", for example. That is to say that in phases in which no user data are transferred on a particular channel, the additional data can be transferred on this channel.

In another development of the method, the additional data are rejected at a receiver. Advantageously, these additional data therefore do not interfere with the receiver.

If, in line with another embodiment of the method according to the invention, the additional data are in a form such that the additional data are rejected on the basis of an infringement of guidelines defined in a standard, the reception appliances can continue to operate in compliance with the standard, i.e. there is advantageously no need to alter the design or software of the terminals, for example.

Further advantageous embodiments of the method according to the invention and an arrangement and a device for transferring data via a plurality of channels can be found in the claims.

In the text below, the invention is explained in more detail with reference to the appended figures, in which:

BRIEF DESCRIPTION OF THE SEVERAL VIEWS OF THE DRAWING

FIG. 8 shows a table presenting measures for forcing Ethernet frames to be rejected, and FIG. 9 shows the schematic structure of an Ethernet frame without preamble and a start frame delimiter.

DESCRIPTION OF THE INVENTION

A first option for reducing the influence of crosstalk interference is to connect the data transfer according to need and to modify the spectrum on an individual basis. In other words, the data transfer on those lines on which no user data are transferred at a particular moment can be adjusted to a limited extent or even completely. As described above, this is consciously not done in most cases, however, firstly in order to be able to continue to use the negotiated data rate continuously, as mentioned above, but also, additionally, in order to ensure that the interference acting on other subscribers is steady over time and spectrally white.

Apart from the variability in the user data traffic over time, there is also an unavoidable unsteadiness as a result of the connection and disconnection of CPE ("Customer Premises Equipment") at the subscriber end. Although the network operators recommend that subscribers leave the CPE switched on at all times, many customers more often switch off their CPE solely on account of power consumption.

Figure 1:
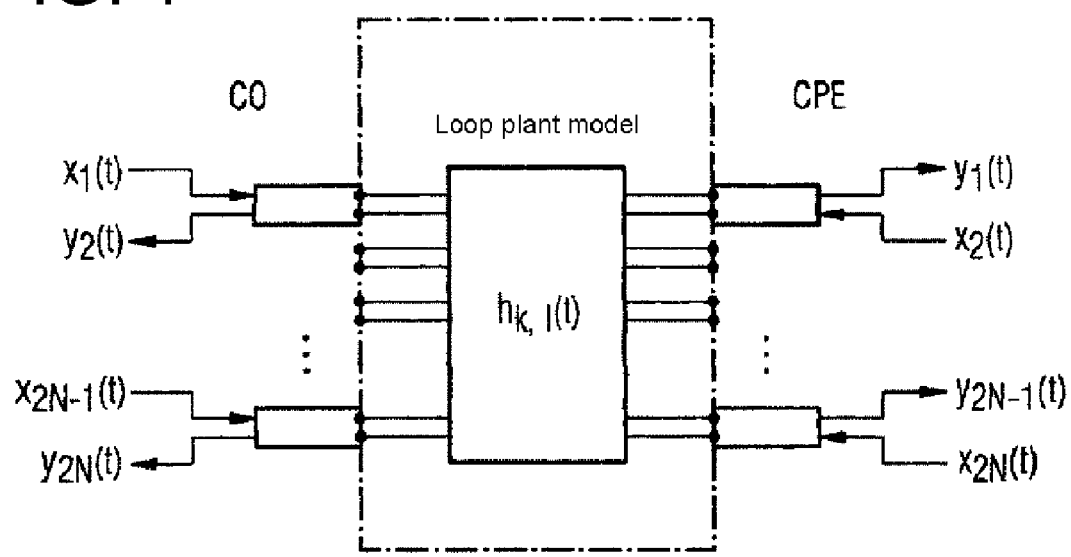
FIG. 1 shows modeling of near end and far end crosstalk by a MIMO system.

Modeling of near end and far end crosstalk in connection with xDSL broadband access engineering is shown in FIG. 1. In this figure the "Loop plant model" represents the entire line infrastructure between the aggregation and the subscriber, that is to say including primary cable distributors, any cable splitters and all (undesirable) crosstalk relationships. In particular, it is advantageous to model the downstream direction to the subscriber (=CPE=customer premises equipment) and the upstream direction to the office (=CO=central office) as separate virtual ports, since the transfer takes place in different directions and reciprocal interference may also arise.

A linear, time-invariant MIMO system (MIMO: "Multiple Input Multiple Output" system with a plurality of input and output variables) is stipulated by the matrix of impulse responses $h_{k,l}(t)$ (*represents the convolution):

$$y_k(t) = \sum_{l=0}^{2N} (h_{k,l} * x_l)(t) \qquad \text{Equation (1)}$$

In this case, the diagonal components $h_{k,k}(t)$ correspond to the desirable transfer channels (these are thus what are known as the line impulse responses), and the external diagonal elements $h_{k,l}(t), k \neq l$ characterize the undesirable crosstalk between the virtual port with the index k and the port with the index l. A real port is accordingly made up of two virtual ports, one for the upstream direction and one for the downstream direction. It is therefore also possible, in particular, for what is known as SELFT-NEXT (near-end crosstalk between upstream and downstream for the same physical ports) to be covered by a compact mathematical model.

Figure 2:
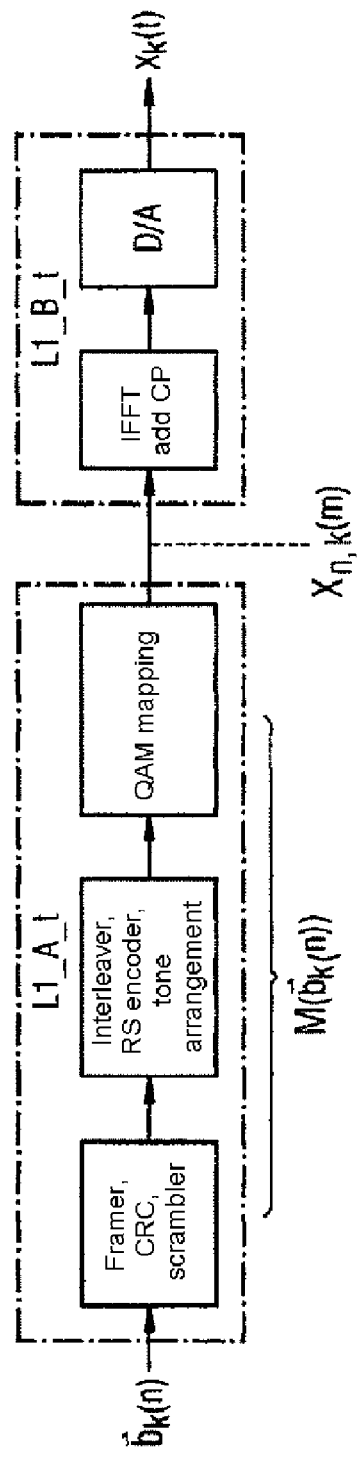
FIG. 2 shows a schematic illustration of the transmission-end breakdown of the processing chain.

For the consideration which follows, the processing chain is broken down in the transmitter on port k, as can be seen in FIG. 2. Specifically, the processing chain is broken down into: (i) an abstracted bit modulator (L1_A_t), which describes the mapping of a bit vector $\vec{b}_k(n)$ onto the complex-value QAM coefficients $X_{n,k}(m)$ (QAM: Quadrature Amplitude Modulation), and ii) a section, denoted by L1_B_t, in which the transmitted signal shaping using IFFT, the addition of the cyclic prefix and a digital/analog conversion (D/A conversion) are combined. (What is known as the "cyclic prefix" is the repetition of the end of a symbol at the start of an OFDM symbol—OFDM stands for "Orthogonal Frequency-Division Multiplexing").

Overall, the output of the block diagram shown in FIG. 2 produces the analog transmitted signal x(t). In this expression, m denotes the carrier frequency index and n denotes the time index in the DMT symbol clock. DMT denotes "discrete multitone transmission", the modulation method used for ADSL, for example.

Figure 3:
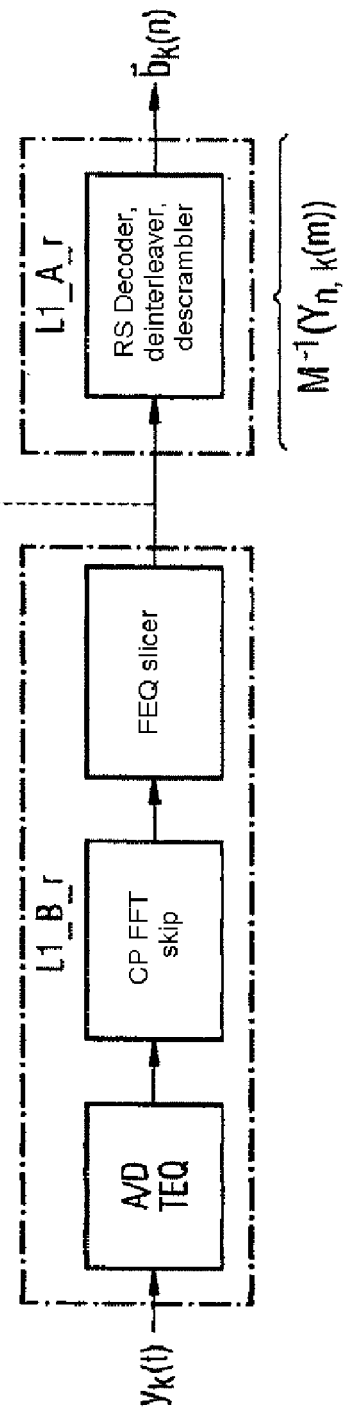
FIG. 3 shows a schematic illustration of the reception-end breakdown of the processing chain.

FIG. 3 shows the dual breakdown for the reception end. In this figure, y(t) represents the analog received signal, $Y_{n,k}(m)$ represents the already decided complex QAM received symbols, and the symbol $\vec{b}_k(n)$ represents the bit vector resulting from the decoding.

With the proviso of frame synchronization for the DMT/OFDM symbols and a sufficient length for the cyclic prefix, the continuous-time convolution from equation (1) merges into multiplication of complex QAM coefficients as follows:

$$Y_{n,k}(m) = \sum_{l=0}^{2N} H_{k,l}(m) X_{n,l}(m) \qquad \text{Equation (2)}$$

Figure 4:
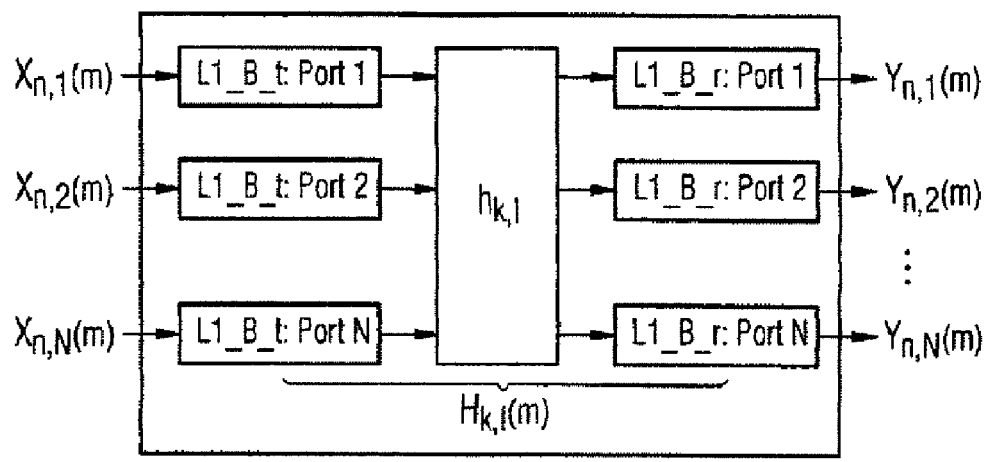
FIG. 4 shows a schematic illustration for the definition of the MIMO system matrix in the frequency domain.

In this case, $X_{n,l}(m)$ represents the QAM coefficients of the transmitted symbol and $Y_{n,k}(m)$ is the relevant complex received symbols prior to the decision (l is the port index, m is the carrier frequency index, n is the time index in the DMT symbol clock). The channel is assumed to be time-invariant, which is why there is no dependency on the time index. $H_{k,l}(m)$ essentially corresponds to the samples of the Fourier transforms of the channel impulse responses, sampled in the pattern of the carriers in the multicarrier modulation. It should be emphasized that $H_{k,l}(m)$ includes not only the physics of the transfer channel but also the IFFT stage and also the add cyclic prefix stage of the processing chain of the transmitting modem and the skip cyclic prefix stage and also the FFT stage of the processing chain of the receiving modem. A model of this is shown in FIG. 4.

In current communication networks, what is known as the MIMO precompensation is often used. This aims at transmission-end precompensation for the crosstalk through formation of linear combinations of the QAM transmitted symbols, as follows:

$$\tilde{X}_{n,k}(m) = \sum_{l=0}^{2N-1} P_{k,l}(m) X_{n,l}(m) \qquad \text{Equation (3)}$$

In this case, $\tilde{X}_{n,k}(m)$ represents the modified transmitted symbols (where k is the port index, m is the carrier frequency index and n is the time index). The precompensation matrices $P_{k,l}(m)$ are essentially formed by inverting the MIMO channel matrix per carrier index m:

$$P_{k,l}(m) = (H_{k,l})^{-1}(m) \qquad \text{Equation (4)}$$

Accordingly, equation (3) shows that the transmitted signal from the k-th port consciously has the transmitted signals from all other ports admixed with it in the correct phase, so that they are destructively superimposed on the crosstalk signals up to the receiver and are thereby canceled. Since this precompensation modifies the transmitted spectral power density, (simple) nonlinear intervening actions may also be necessary in addition to the linear modification in equation (4).

By way of example, a suitable modular operation during transmission (depending on the degree of QAM modulation and the QAM configuration) can be used to ensure that the permitted transmitted power per carrier is not exceeded. A suitable procedure is described by way of example in "G. Ginis, J. M. Cioffi, Vectored Transmission for Digital Subscriber Line Systems, IEEE JSAC special issue on twisted-pair transmission. Vol. 20, Issue 5, pp. 1085-1104, June 2002" and "G. Tauböck, W. Henkel, MIMO systems in the subscriber-line network, 5th International OFDM Workshop 2000, Hamburg" and is therefore not explained in more detail mathematically in this publication. However, it should be noted here that the transmission-end modular operation also necessitates a reception-end modular operation and therefore usually cannot be performed without upgrading the firmware of the subscriber terminal.

If the MIMO channel matrix is highly diagonal dominant (this is always the case with xDSL, but not with wireless applications such as WIMAX), it is possible to dispense with such nonlinear power regulation through modular operation.

Figure 5:
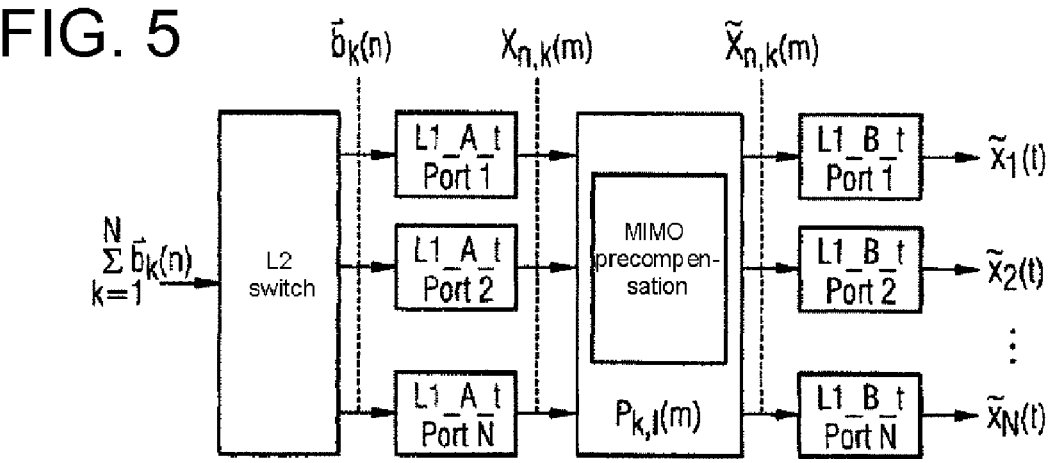
FIG. 5 shows an illustration of the basic scheme of conventional precompensation.

FIG. 5 shows a schematic block diagram of the basic scheme of such MIMO precompensation. A prerequisite for this precompensation is that the MIMO channel matrix $H_{k,l}(m)$ is known, i.e. this matrix needs to be ascertained prior to the actual data transfer, for example by a suitable identification algorithm.

Even if the above description is tailored specifically to DMT-like multicarrier modulation systems, the basic principles can be applied to any FFT-based modulation methods: It is merely the content of blocks L1_A and L1_B that alters in each case.

As already indicated above, the MIMO signal processing is usually strictly separated from the higher layers of the layer model commonly used in communications engineering, i.e. the signal processing continues uninterrupted even without user data traffic. If now usual aggregation factors of 1:50 are assumed for broadband customers with average use, only a maximum of 1/50 of the bit-transparent transfer channel is accordingly actually used for user data in relation to IP transport.

This technological weakness is utilized or overcome by the inventive concept. One idea in this regard is to introduce the statistical multiplexing of the IP traffic (layer 3—L3) into the physical layer (L1) continuously, so that, by way of example, transmission-end "silence" on L3 also corresponds to transmission-end approximative "silence" on L1, or a transfer or what is known as a "broadcast" on L3 also corresponds to a physical broadcast on L1. Furthermore, instead of dummy units (for example ATM idle cells, Ethernet dummy frames), it is also possible to send MIMO-optimized data packets which are rejected by the direct receiver but which are physically useful for the cross channels (particularly also in the training phase). This concept is called "cross-layer modulation".

Formerly, the bit sequences to be transferred comprise a piece of frame information, which is fixed at least within an IP session and which is subsequently described by the bit pattern vector $\vec{b}_0(n)$, and a payload bit vector $\vec{d}_k(n)$. If the mask which separates frame information and useful information is denoted by $B_0$ then:

$$\vec{b}_k(n) = \vec{b}_0(n) \oplus (B_0 \otimes \vec{d}_k(n)) \qquad \text{Equation (5)}$$

is true. Here, $\otimes$ represents a binary AND function (GF(2) multiplication) and $\oplus$ represents a binary XOR function (GF(2) addition). If the processing block L1_A_t is broken down as follows into an encoding block and the QAM mapper $$M(\vec{b}_k(n)) = Q(C(\vec{b}_k(n))), \qquad \text{Equation (6)}$$

then the following superimposition law applies on account of the GF(2) linearity of the scrambler, interleaver and Reed-Solomon-Coder:

$$C(\vec{b}_k(n)) = C(\vec{b}_0(n)) \oplus C(B_0 \otimes \vec{d}_k(n)) \qquad \text{Equation (7)}$$

That is to say that it is possible, in principle, to encode the overhead bits and the data bits separately and then to combine them with one another by means of a simple XOR operation in order to calculate the encoding of the overall bit pattern.

The mathematical implementation of the inventive "cross-layer idea" requires a desired complex transmitted symbol $\vec{X}_d$ to have that bit pattern found for it which, by means of the modulation mapping, achieves an optimum approximation of the desired symbol vector $\vec{x}_d$ with a valid QAM transmitted symbol. In this case, $\vec{X}_d$ is generally not an admissible QAM transmitted symbol, for example $\vec{X}_d = \vec{0}$ may be required (when a maximum reduction in the transmitted power is involved). It is therefore not possible to refer to customary inversion of the nonlinear M( ) operator; instead, the following binary optimization problem is involved:

$$\vec{d}_{opt} = \underset{\vec{d}}{\operatorname{argmin}} \| M(\vec{b}_0 \oplus (B_0 \otimes \vec{d})) - \vec{X}_d \| \qquad \text{Equation (8)}$$

In this case, the vector norm is the sum over all carriers over the absolute value of the complex differences between the complex-value vectors $$\| \vec{X}_1 - \vec{X}_2 \| \stackrel{def}{=} \sum_m |X_1(m) - X_2(m)| \qquad \text{Equation (9)}$$

On account of the nonlinearity of the M( ) operator, it is possible to exclude a simple solution to this binary vector optimization problem with a high level of certainty. Therefore, by way of example, a semi-heuristic ambient search method, described below, is proposed for the approximative solution to equation (8):

In a first step, a certain number of what are known as "candidate symbol vectors" at a (relatively short) euclidian distance q from the desired symbol is sought:

$$\Omega = \{ \vec{X} \in Q \| \vec{X} - \vec{X}_d \| < q \} \qquad \text{Equation (10)}$$

Next, in step 2, a corresponding set of "candidate bit patterns" $\Psi$ is calculated for the set of QAM candidate symbol vectors $\Omega$:

$$\Psi = \{ \vec{b} = M^{-1}(\vec{X}), \vec{X} \in \Omega \}' \qquad \text{Equation (11)}$$

In step 3, a search is then performed within the set of candidate bit patterns Ψ until a valid bit pattern for the encoding and overhead information is found:

$$\tilde{d} = B_0 \otimes \tilde{d}, \tilde{b}_{0,0} \oplus (B_0 \otimes \tilde{d}) \in \Psi \quad \text{Equation (12)}$$

If the search in line with equation (12) is unsuccessful, the distance q is increased and the process begins again from step 1.

The complexity of the method according to the invention is quite critically dependent on the complexity of the processing blocks L1_A_t and L1_A_r. If these blocks comprise a Reed-Solomon-decoder, for example, repeated Reed-Solomon decoding needs to be performed in step 3 of the above iteration, which means significant computation involvement. The DMT-based xDSL methods allow the L1_A_t block to be configured. By way of example, a configuration which is as simple as possible should be connected here (i.e. for example Reed-Solomon disconnected, interleaver with minimum depth, tone ordering disconnected), which allows a significant simplification of the iteration described above to be achieved.

A further concept of the invention is the embedding of the cross-layer modulation described above into existing access networks or access systems.

Figure 6:
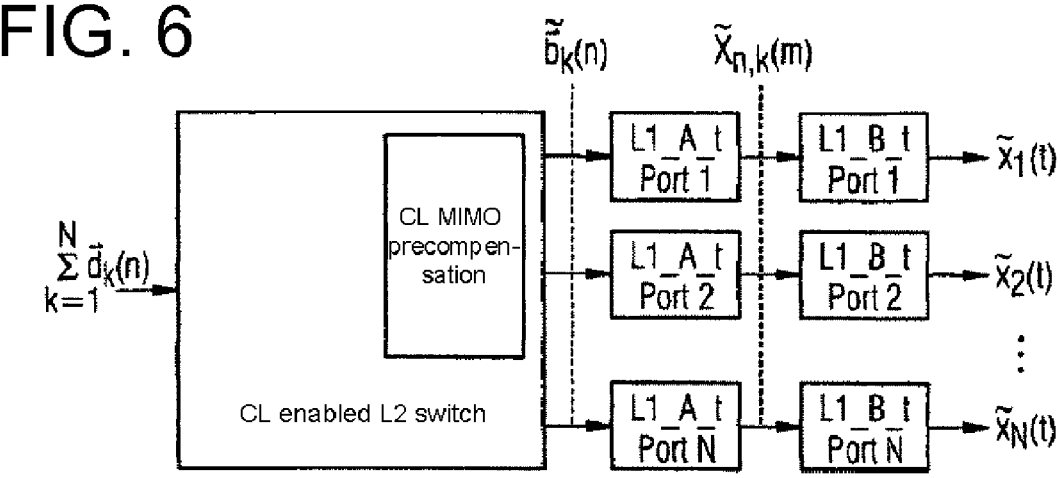
FIG. 6 shows a schematic illustration of the cross-layer MIMO precompensation in a linecard variant.

FIG. 6 shows an exemplary application of the cross-layer modulation for MIMO precompensation: in this case, in comparison with conventional MIMO precompensation (FIG. 5), the MIMO-specific processing is moved from the modem chip set to the network processor of the layer-2 switch, for example. In reference to processor technology, there is no fundamental problem, since all operations can be attributed only to binary operations or table lookups.

The modified bit vectors of the individual ports are denoted by $\tilde{b}_{0}(n)$; the total bit rate of these vectors is generally a bit rate originating from the backbone of the network.

In this case the layer-3 payload is denoted formally by $\tilde{d}_k(n)$. The incoming data are first buffer-stored in a port-specific buffer area, as usual. When the buffer area has been processed, however, in particular no "useless" random data are forwarded to layer 1; instead, the previously described procedure is used to ascertain that binary vector which contributes accordingly to the precompensation for the crosstalk on the other active ports. Given the usual aggregation factors, it can be assumed that only a few ports are active simultaneously and that statistical time-division multiplexing can be achieved within the virtual cluster groups solely by taking account of the MIMO matrix structure during buffer reading. That is to say that, in a group of ports interfering with one another, only one port ever performs user data transfer, while the other ports are virtually "silent" via cross-layer modulation or transmit the correct-phase compensation signal for the active port. For highly diagonal dominant MIM systems, as occur in the xDSL methods, inter alia, first simulations appear to indicate that it makes no sense to transmit correct-phase compensation signals, since the high level of damping on the cross-channels means that there is no significant performance gain.

Figure 7:
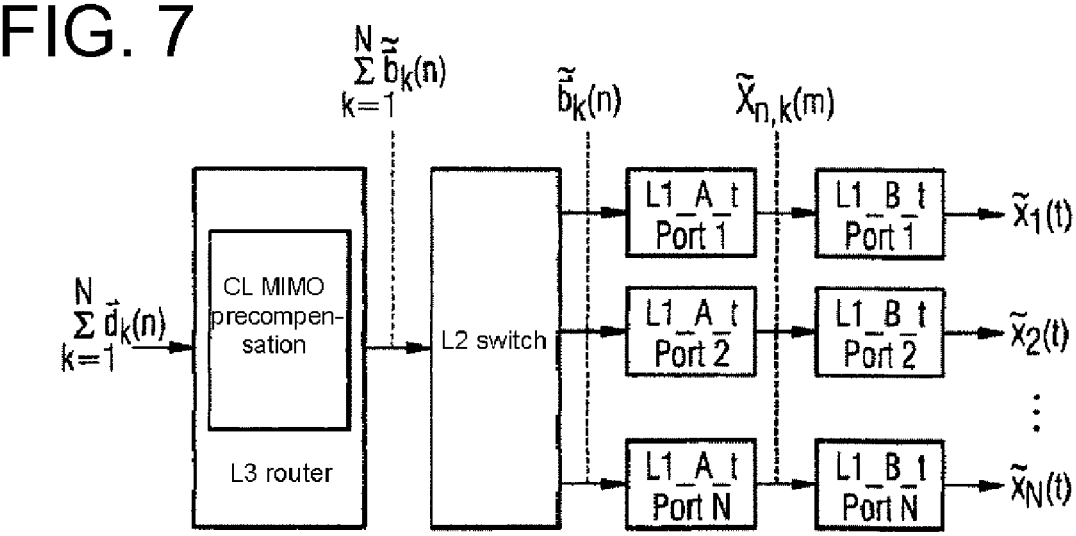
FIG. 7 shows a schematic illustration of the cross-layer MIMO precompensation in a backbone variant.

It should be noted that, as an alternative to the scheme described above, the MIMO precompensation preprocessing can also be performed at the level of the layer-3 processing of a router, for example (see FIG. 7), provided that a) there is still bandwidth reserve from the backbone and b) there is a deterministic and known encapsulation strategy for the layer-2 switch.

The invention thus involves transferring data via a plurality of channels by using at least one channel to transfer additional data. The transfer of these additional data advantageously influences the transfer of the data in at least one of the further channels. Whereas, in the exemplary embodiment above, the transfer of the additional data influences the transfer of user data, for example, on the further channels such that interference in the further channels is reduced, it is likewise possible to contemplate transferring the additional data in order to reinforce the user data on the further channels, for example.

Furthermore, it should be noted that usually the connection setup from DMT-based modems is started with an initialization phase in which standardized test signals are transmitted which are used particularly for channel identification. A conventional initialization phase is, by nature, not sufficient for identifying the MIMO channel matrix, since it is not the intention of the standardized methods to consider more than one port simultaneously.

Advantageously, the method according to the invention can therefore be used to apply the concept described in equations (5)-(8) for transmitting test signals (what are known as pilot signals) for MIMO channel identification during the actual data transfer phase. Particularly when a port k is connected anew, port l can contribute to the MIMO coefficient $h_{k,l}$ being able to be identified: the predefined dummy data from port 1 can be registered with port k and thus allow the MIMO coefficient $h_{k,l}$ to be identified. Without such a measure, all ports which are a possibility for crosstalk and are already connected would need to be reinitialized when a new user is first connected.

The text flow explains a specific Ethernet variant of cross-layer modulation without a CPE upgrade. This exemplary embodiment has the advantage that the method according to the invention can therefore also be performed when conventional subscriber terminals are used.

In this example, the compensation Ethernet frames are transferred exclusively via the xDSL link. With the receiver, these compensation frames then need to be rejected, since the novel, inventive method is not implemented in the terminal. It is therefore necessary to find a method which forces the frames to be rejected and/or prevents the frames from being forwarded. To this end, one or more of those criteria which are relevant to the validity of the frame/packet in the layer in question need to be specifically infringed in at least one of the layers above the physical layer. The table from FIG. 8 shows a few such examples in relation to layer 2 (for Ethernet methods).

As can be seen from the table, the effectiveness of the individual measures is dependent on the mode of operation of the appliance at the receiver end (e.g. CPE). If the appliance at the receiver end is operating as a router, layer 2 (i.e. the Ethernet) is terminated there. The received Ethernet frames are therefore checked for validity on the basis of all the criteria required as standard. In a bridge (network bridge), on the other hand, only what is known as the "frame check sequence" is checked, and the frames are then forwarded without the content thereof being examined.

Specifically, the following methods can be performed, for example:

Method 1 uses forced rejection of the Ethernet frames. In this case, the Ethernet frames are rejected by the receiver if they are recognized as invalid. By way of example, a frame check sequence which is incorrect for the frame can consciously be transferred, which sometimes requires a change in the hardware of the xDSL transceiver chips, however. Implementation is therefore comparatively involved.

What are simpler to implement are methods which manipulate the Ethernet frame in the actual MAC client, for example. As can be seen in FIG. 9, the MAC client (e.g. a network processor) on the DSLAM linecard or in the CPE provides the xDSL transceiver chip with the Ethernet frame from the destination address through to the field MAC Client Data. The following methods can be implemented by Ethernet frames manipulated in the MAC client.

Method 2 also uses forced rejection of the Ethernet frames. In this case, the frame is rejected by the receiver if an unsupported or unknown type (Ethertype) is entered in the Length/Type field, when the length of the frame intentionally exceeds the maximum permissible length of a frame (cf. [IEEE 8023]) or when, although the value in the Length/Type field is a length statement (i.e. when the value is less than 0×600), an inapplicable value is intentionally selected, for example. However, to this end, the receiver (DSLAM-CPE) needs to be configured such that it checks the Ethertype or the frame length. In some configurations (e.g. in some bridges), the Ethernet frames are forwarded to the network immediately without checking layer 2. When compensation frames are transferred only in the downstream direction (i.e. from DSLAM to the CPE), the method can be applied even if the CPE does not perform a check, that is to say if it is accepted that the compensation frames are not rejected until on a customer's terminal or router.

When using both methods 1 and 2, it does not matter which destination address is used.

A third exemplary method involves preventing the relevant Ethernet frames from being forwarded. In this case, it is necessary to ensure that the compensation Ethernet frames from the DSLAM are sent precisely to the CPE and the frames from the CPE are sent precisely to the DSLAM (for operation in the upstream direction). Unknown MAC destination addresses result in the Ethernet frames being forwarded to all other network elements (what is known as "Flooding"). However, the MAC destination addresses sought are respectively known for the CPE and the DSLAM only when the CPE is registered in the network. Only at this time is the CPE's MAC address known in the DSLAM and the DSLAM's MAC address known in the CPE. So as to be able to use cross-layer modulation even when there has still not been any regular Ethernet frames interchanged between the CPE and DSLAM, it is necessary to use broadcast and multicast MAC destination addresses. If the DSLAM and CPE are configured as a bridge, however, frames addressed to a broadcast/multicast address are also forwarded. In such a case, a remedy is provided by the Slow_Protocols_Multicast address from [IEEE8023], Annex 43B, for example. Ethernet frames which are addressed to such a Slow_Protocols_Multicast address are not forwarded by definition.

Method 4 uses forced rejection of the frames using a Slow_Protocols_Multicast address. When the Slow_Protocols_Multicast address is used, the compensation Ethernet frame can be output as a frame of a slow protocol. This is done by using the Slow_Protocols_Type value in the Length/Type Field of the frame (cf. [IEEE8023], Annex 43B). The Protocol Subtype Identifier, which, following on from the Length/Type Field, flags the slow protocol used, can in this case be set to an impermissible value in order to force rejection. Suitable values for this purpose are the values 0 and 11 to 255 according to [IEEE8023], Table 43B-3. Frames with invalid or impermissible Protocol Subtype Identifiers are rejected by the receiver.

The invention claimed is:

1. A method for transferring data via a plurality of channels having interfering influences resulting from near-end crosstalk and far-end crosstalk, which comprises:
using at least one channel of the plurality of channels to transfer additional data and thereby influencing, with the transfer of the additional data, a transfer of the data in at least one of the further channels in a specific manner with respect to the interfering influences, the additional data being transferred in phases in which no user data is transferred on the at least one channel.

2. The method according to claim 1, which comprises influencing the transfer of the data in the at least one of the further channels to thereby reduce interference in the at least one of the further channels.

3. The method according to claim 1, which comprises transferring the additional data instead of dummy data.

4. The method according to claim 1, which comprises discarding the additional data at a receiver.

5. The method according to claim 4, which comprises generating the additional data in a form such that the additional data are rejected, at the receiver, on a basis of an infringement of guidelines defined in a transmission standard.

6. The method according to claim 1, which comprises transferring the data in accordance with an xDSL method.

7. The method according to claim 1, which comprises transferring the data in accordance with an Ethernet standard and/or rejecting the additional data on a basis of an infringement of a guideline in the IEEE8023 standard.

8. An arrangement for transferring data via a plurality of channels having interfering influences resulting from near-end crosstalk and far-end crosstalk, comprising:
transfer means for transferring additional data via at least one channel of the plurality of channels; and
said transfer means configured to transfer the additional data in such a form as to influence a transfer of the data in at least one further channel in a specific manner with respect to the interfering influences, said additional data being transferred in phases in which no user data is transferred on said at least one channel.

9. The arrangement according to claim 8, wherein said transfer means are configured to cause the transfer of data in the at least one further channel to be influenced such that interference in the at least one further channel is reduced.

10. The arrangement according to claim 8, wherein said transfer means are configured to transfer the additional data instead of dummy data.

11. A device for transferring data via a plurality of channels having interfering influences resulting from near-end crosstalk and far-end crosstalk, comprising:
transmission means for transmitting additional data via at least one channel of the plurality of channels; and
said transmission means configured to transmit the additional data in such a form as to influence a transmission of the data in at least one further channel in a specific manner with respect to the interfering influences, said additional data being transferred in phases in which no user data is transferred on said at least one channel.

12. The device according to claim 11, wherein said transmission means are configured to cause the transmission of data in the at least one further channel to be influenced such that interference in the at least one further channel is reduced.

13. The device according to claim 11, wherein said transmission means are configured to transfer the additional data in place of dummy data.

* * * * *